(12) United States Patent
Mélange et al.

(10) Patent No.: US 8,380,079 B2
(45) Date of Patent: Feb. 19, 2013

(54) CIRCUIT FOR END-OF-BURST DETECTION

(75) Inventors: Cedric Mélange, Beveren (BE); Johan Bauwelinck, Temse (BE); Xing Zhi Qiu, Wondelgem (BE); Jan Vandewege, Mariakerke-Gent (BE)

(73) Assignees: IMEC, Leuven (BE); Universiteit Gent, Gent (BE)

( * ) Notice: Subject to any disclaimer, the term of this patent is extended or adjusted under 35 U.S.C. 154(b) by 352 days.

(21) Appl. No.: 12/886,298

(22) Filed: Sep. 20, 2010

(65) Prior Publication Data

US 2011/0069952 A1    Mar. 24, 2011

Related U.S. Application Data

(60) Provisional application No. 61/244,291, filed on Sep. 21, 2009.

(30) Foreign Application Priority Data

Mar. 22, 2010  (EP) ..................................... 10157244

(51) Int. Cl.
*H04B 10/00* (2006.01)
*H04B 10/06* (2006.01)
(52) U.S. Cl. .......................... 398/155; 398/154; 398/202
(58) Field of Classification Search .................. 398/154, 398/155, 202
See application file for complete search history.

(56) References Cited

U.S. PATENT DOCUMENTS 6,977,965 B2 * 12/2005 Nguyen et al. ................ 375/279
8,150,272 B2 *  4/2012 Ossieur et al. ................ 398/202

FOREIGN PATENT DOCUMENTS

EP    0788242    8/1997
EP    2019501    1/2009

OTHER PUBLICATIONS

European Search Report, European Patent Application No. 10157244.4 dated Aug. 25, 2010.
IEEE 802.3av-2009 Part 3: Carrier Sense Multiple Access with Collision Detection (CSMA/CD) Access Method and Physical Layer Specifications, IEEE Standards for Information Technology, Sep. 2009, pp. 112-117.

* cited by examiner

*Primary Examiner* — Dalzid Singh
(74) *Attorney, Agent, or Firm* — McDonnell Boehnen Hulbert & Berghoff LLP

(57) ABSTRACT

A circuit for end-of-burst detection in a portion of a received bit stream is disclosed. The circuit comprises:
   a first counter for counting the number of bits in the portion,
   a second counter for counting the number of bit value transitions in the portion, and
   a circuit for comparing the counted number of bits in the portion and the counted number of bit value transitions therein with preset values, the circuit for comparing is further arranged for generating a signal indicative of end-of-burst detection based on the result of the comparison.

11 Claims, 3 Drawing Sheets

CIRCUIT FOR END-OF-BURST DETECTION

CROSS-REFERENCE TO RELATED APPLICATIONS

This application claims priority to U.S. Provisional Application 61/244,291 filed on Sep. 21, 2009, and to European Application No. EP 10157244.4 filed on Mar. 22, 2010, both of which are herein incorporated by reference for all purposes.

FIELD

The present invention generally relates to the field of devices and methods for recovering signals over a passive optical network.

BACKGROUND

A burst-mode receiver (BM-RX) is typically located in the Optical Line Termination (OLT) of a Passive Optical network (PON), as shown in FIG. 1. In general, the BM-RX comprises a photodiode, a burst-mode transimpedance amplifier (BM-TIA), a burst-mode limiting amplifier (BM-LA) and a burst-mode clock phase alignment (BM-CPA) block. In essence, the BM-RX converts the photodiode current into a voltage (BM-TIA), amplifies this voltage (amplitude/threshold recovery) and aligns this signal to the OLT clock (phase recovery). To achieve these functionalities the BM-RX requires time critical functions like activity detection, reset generation and clock phase alignment.

In conventional feedback receivers the threshold recovery is implemented as an offset compensation loop with fixed time constant. In burst-mode inaccurate peak-detectors are often used to realize a fast threshold setting. The clock and data recovery (CDR) that succeeds the amplitude recovery unit, generally uses a phase locked loop (PLL) or delay locked loop (DLL), again with fixed time constant.

Further, activity detection indicates a data burst being received. The activity detection signal is typically used to initiate the reset generation, the decision threshold extraction and the clock phase aligner (CPA) (so for both amplitude and phase recovery). In prior art burst mode receivers activity is detected by comparing the incoming signal with a reference voltage. This reference voltage depends on the combined DC offsets from the unipolar signal, the preceding transimpedance amplifier (TIA) and offsets from the activity detection circuitry itself. This system can only be used if this DC offset is the same for all bursts. In long-range optical networks with optical amplifiers or when using TIAs that already compensate part of the offset, this is no longer the case.

In prior art end-of-burst (EOB) detection solutions the number of consecutive zeros are counted. An EOB is detected when this number exceeds the maximum consecutive identical digits (CID) that can occur in the received bit stream. Although this technique works very well at low BER (e.g. EPON, GPON), it quickly starts to miss EOBs when the bit-error-rate (BER) rises. Extra functionality must then be added to make the EOB detection more reliable in these conditions. Consequently, there is a need for a method and circuit for end-of-burst detection that works well also in case of a high BER (or, equivalently, a low SNR).

SUMMARY

Embodiments of the present invention are directed to a circuit for end-of-burst detection in a portion of a received bit stream, the circuit comprising:

a first counter for counting the number of bits in the portion, a second counter for counting the number of bit value transitions (i.e. zero-one and one-zero transitions) in the portion, and a circuit for comparing the counted number of bits in the portion and the counted number of bit value transitions therein with preset values, the circuit for comparing being further arranged for generating a signal indicative of end-of-burst detection depending on the result the comparison.

In an embodiment, the circuit for end-of-burst detection further comprises an intermediate reset generation when the second counter exceeds a preset value, to speed up the reaction time of the detection circuit. Such a circuit is indeed suitable for use in conditions of high BER. By monitoring the data transitions in consecutive bit stream portions (i.e. consecutive time windows) and allowing a programmed, preset number of bit errors the end-of-burst detection is made robust against bit errors. In this way it is avoided that an EOB is missed in case one or a few bits would be wrong when the communication system operates at a low SNR. Moreover, in case it is observed that the number of bit value transitions already exceeds the preset value before the preset number of bits in the bit stream portion under consideration is reached, the whole circuit can immediately be reset, since it makes no sense to count further anymore. In this way the reaction time of the detection circuit is speeded up considerably.

In an advantageous embodiment the preset values are programmable.

Preferably the comparator means is implemented with a first comparator circuit in connection with the first counter and a second comparator circuit in connection with the second counter.

In an advantageous embodiment the portion of the bit stream contains a number of bits equal to a multiple of the maximum number of consecutive identical digits allowed in a bit stream according to the 10 GEPON standard or the XGPON2 standard.

Embodiments of the invention are also directed to an optical receiver structure comprising a circuit for end-of-burst detection as previously described.

DETAILED DESCRIPTION

Figure 1:
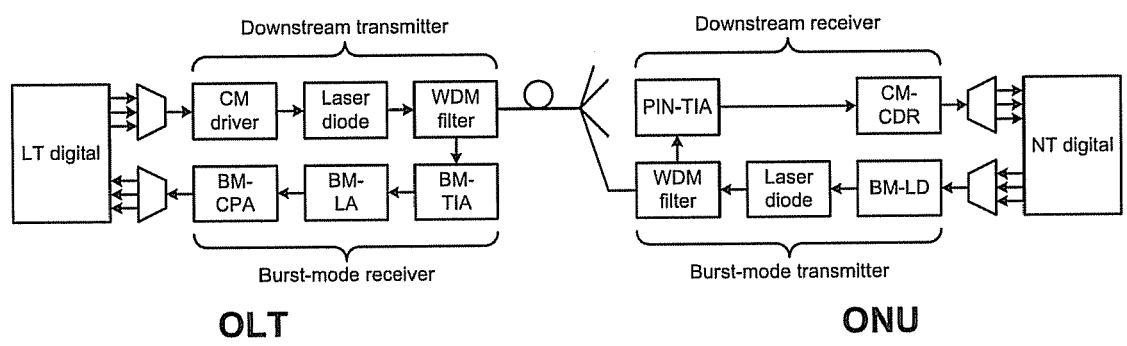
FIG. 1 illustrates a block diagram of the functional building blocks in a PON network.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in sequences other than those described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in orientations other than those described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting of only components A and B. It means that with respect to an embodiment of the present invention, the only relevant components of the device are A and B.

The general idea behind a EOB detection is as follows. The circuit counts the number of consecutive zeros in the data stream. When this number exceeds the maximum allowed CID the burst must have ended. When working at very high BERs (like $10^{-3}$ in the recent 10 GEPON standard and a similar number in the emerging XGPON2 standard) this simple approach is likely to exhibit a large number of reset misses. Indeed, when the probability becomes high that the consecutive zeroes at the end of the burst are wrongly detected as ones, this general approach can easily fail to detect the EOB. A circuit for end-of-burst detection is provided that is operable in a burst mode receiver in a communication environment with a high bit error rate.

In the solution proposed in embodiments of the present invention an EOB signal is generated when a programmable number of ones (say N1) or less is detected in a group of bits with programmable length (say L). For example, one can program the detection to generate an EOB signal when two ones or less are detected in a sequence of three times the maximum allowed number of CID. Hence, an EOB can be detected not only in case a series of consecutive zeros is observed with a length exceeding the maximum allowed CID, but also in case one or two wrongly detected ones are present in the considered portion of the bit stream. Note that the specific values of L and N1 preferably take into account the scrambling used in the data signal.

Figure 2:
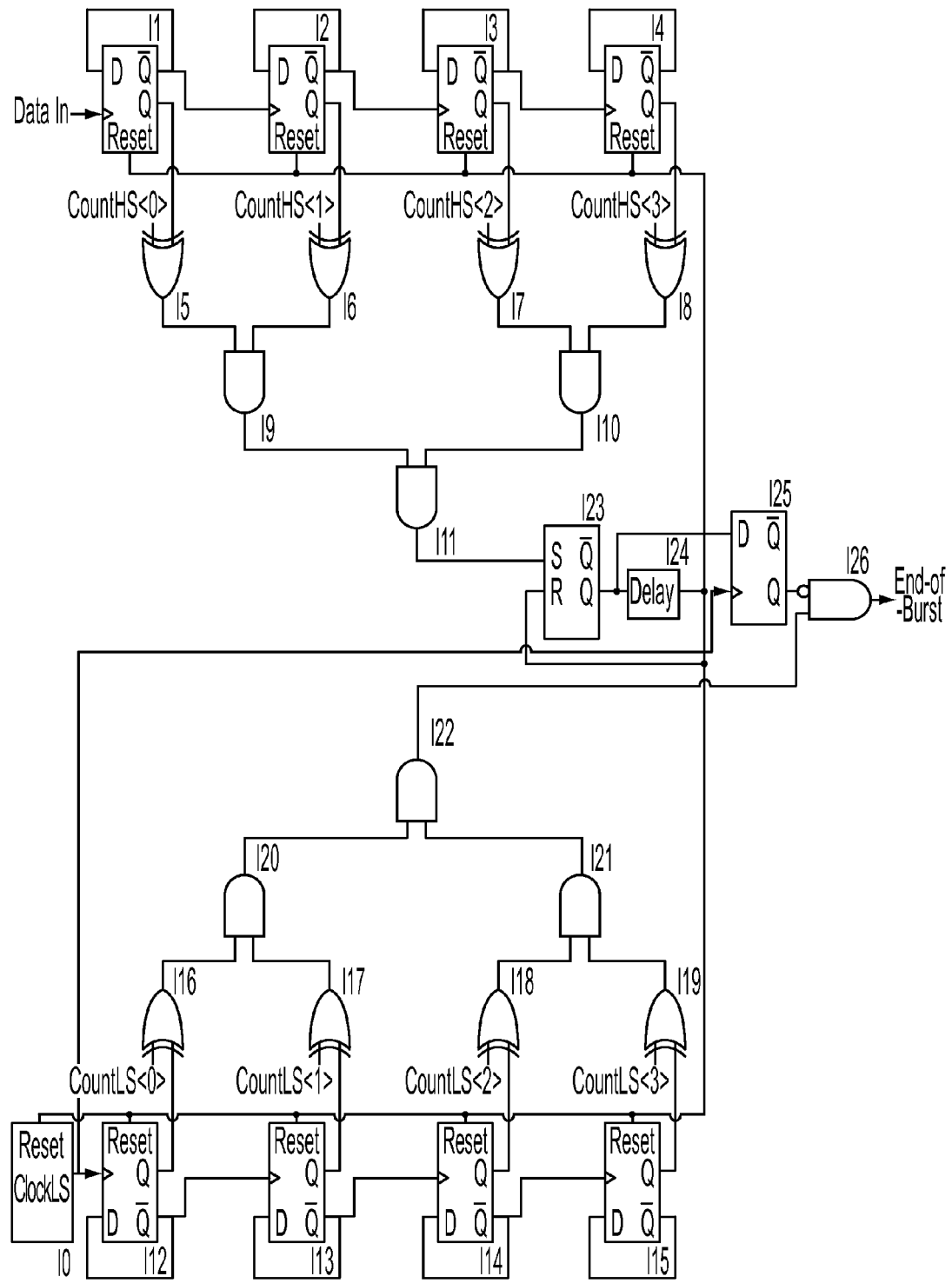
FIG. 2 illustrates an example embodiment of the end-of-burst detection circuit according to the present invention.

An embodiment of the end-of-burst detection circuit according to the invention is depicted in FIG. 2. Two 4-bit counters are in this embodiment implemented as ripple counters each comprising four flip-flops with feedback. The counters formed by I1, I2, I3, I4 and I12, I13, I14, I15 count the number of transitions in the data and the number of clock periods of ClockLS from I0, respectively. ClockLS is a low speed clock which is used as a time reference. A typical clock period would be in the order of the duration of the maximum number of consecutive identical digits.

Each ripple counter is followed by a digital comparator circuit which generates a high level when the counters reach a programmable value. When the number of transitions in the data equals the value CountHS<3:0>, the output of I11 goes high and sets the SR-latch I23. Similarly, the output of I22 goes high when CountLS<3:0> periods of the time reference ClockLS have been counted. If a number of data transitions less then CountHS<3:0> is counted during these CountLS<3:0> periods, an EOB signal is generated by I26.

If an equal or larger number of data transitions was counted during one clock period of ClockLS, the end-of-burst circuit is reset by I24. The delay time of I24 will determine the reset pulse width. This intermediate reset has the advantage that the EOB detection circuit does not need the full CountLS<3:0> periods of the time reference during the data pattern to decide that the burst has not ended yet. This enables the circuit to react faster at the end of the burst.

In the embodiment of FIG. 2, the number of rising edges (at EOB this is equal to the number of ones N1) is counted by the high speed ripple counter (I1,I2,I3,I4) and consequently compared with the programmable value CountHS<3:0>. If N1 exceeds the value of CountHS<3:0> the whole circuit is reset, since it makes no sense to count further (too many ones were detected to decide an EOB is to be generated). This will speed up the reaction time of the detection circuit. Indeed, during the burst the EOB detector doesn't need to wait for full time L to see that the burst is still running. The group length of bits to consider for detection is a multiple CountLS<3:0> of a reference clock period (say P). L=CountLS<3:0> times P. The ripple counter (I12, I13, I14, I15) tracks the number of reference clock periods that have past. When the output of this low speed counter equals CountLS<3:0> and N1 has not exceeded CountHS<3:0>, an EOB signal is generated.

Figure 3:
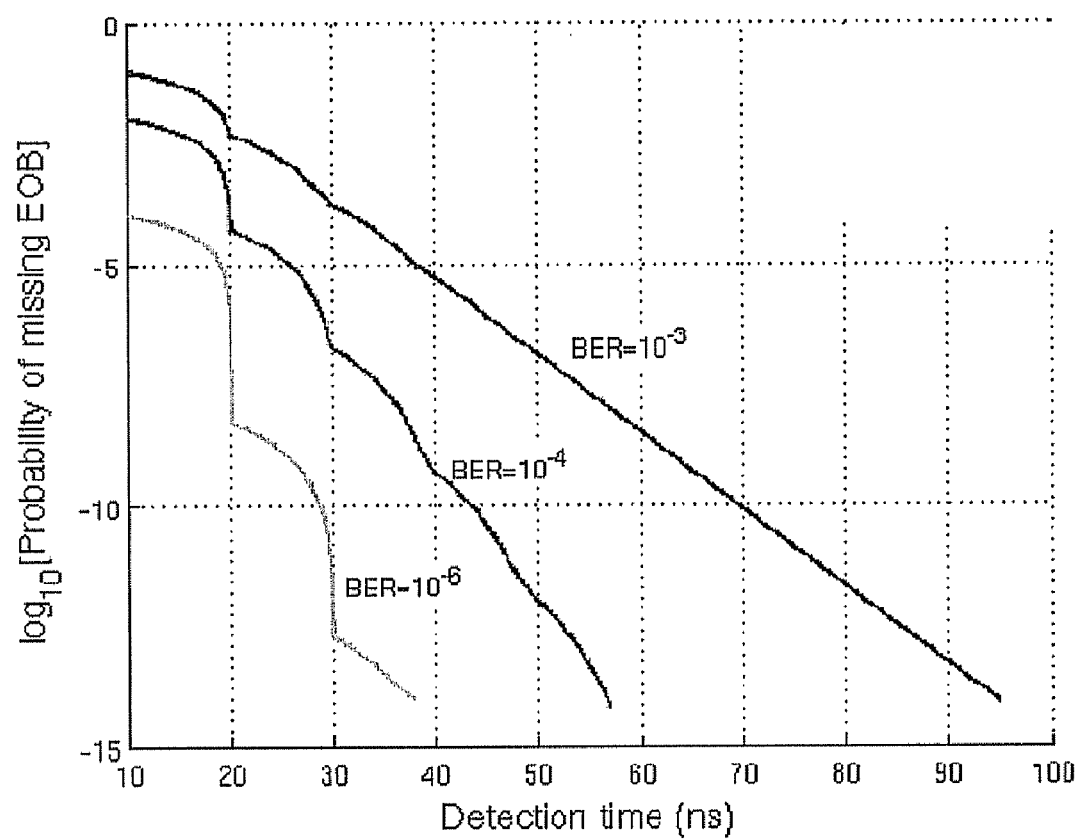
FIG. 3 illustrates the probability EOB miss as a function of the detection time.

The low bit-error-rate (BER) at the upstream physical layer, defined by the latest PON standards ($10^{-3}$ in IEEE 802.3av and a comparable BER value in XGPON2), deteriorates the reliability of the internal start- and end-of-burst generation. Good quality of both signals is however mandatory for proper operation of the DC-coupled burst-mode receiver. The EOB detection cannot be based on pure level detection, as a large number of consecutive zeroes might be a valid data pattern. Usually the number of consecutive zeroes is counted and an EOB signal is generated if this value exceeds a predefined number $CID_{max}$. For $CID_{max}$ equal to 64 (conforming to IEEE 802.3av standard) the probability of an EOB miss would be approximately as high as $10^{-2}$. This is an unacceptable value, as every EOB miss will likely result in a packet retransmission, thereby severely decreasing the network efficiency. Embodiments of this invention present an efficient approach to extend the counting process over a group of for example N bits in order to improve the EOB reliability. In FIG. 3 the probability of an EOB miss is plotted as function of the detection time for N=100, bit rate=10 Gbps and BER=$10^{-3}$, $10^{-4}$ and $10^{-6}$. For very high BER of $10^{-3}$, a detection time of 70 ns is required to bring the EOB miss ratio back to $10^{-10}$. The figure also clearly illustrates the dependence of the detection time on the BER. In this respect the proposed embodiment is very flexible and the detection time can be easily programmed to guarantee the fasted response for a given BER.

The invention claimed is:

1. A circuit for end-of-burst detection in a portion of a received bit stream, the circuit comprising:
   a first counter for counting a first number of bits in the portion;
   a second counter for counting a second number of bit value transitions in the portion;
   a comparing sub-circuit for making comparisons of the first number of bits and the second number of bit value transitions with preset values, the comparing sub-circuit being further arranged for generating a signal indicative of detection of end-of-burst based on a result of the comparisons; and
   an intermediate reset element for generating a reset signal upon a condition of the second counter exceeding a particular preset value, whereby reaction time of the circuit is accelerated by occurrence of the condition prior to a total number of bits in the portion being received.

2. The circuit of claim 1, wherein each bit in the bit stream has a bit duration, and wherein the first counter comprises a clock having a clock signal with a period equal to an integer multiple of bit durations.

3. The circuit of claim 1, wherein the preset values are programmable.

4. The circuit of claim 1, wherein the comparing sub-circuit comprises a first comparator circuit in connection with the first counter and a second comparator circuit in connection with the second counter.

5. The circuit of claim 1, wherein the portion contains a total number of bits equal to a multiple of a maximum number of consecutive identical digits allowed in a bit stream according to the 10 GEPON standard or the XGPON2 standard.

6. An optical receiver structure comprising an end-of-burst detector, the end-of-burst detector comprising:

a first counter for counting a first number of bits in a portion of a received bit stream;

a second counter for counting a second number of bit value transitions in the portion of the received bit stream; and a comparing sub-circuit for making comparisons of the first number of bits and the second number of bit value transitions with preset values, the comparing sub-circuit being further arranged for generating a signal indicative of detection of end-of-burst based on a result of the comparisons; and an intermediate reset element for generating a reset signal upon a condition of the second counter exceeding a particular preset value, whereby reaction time of the circuit is accelerated by occurrence of the condition prior to a total number of bits in the portion being received.

7. In a circuit for end-of-burst detection comprising a first counter, a second counter, and a comparing sub-circuit, a method comprising:

at the circuit, receiving a portion of a bit stream;

counting a first number of bits in the portion with the first counter;

counting a second number of bit value transitions in the portion with the second counter;

at the comparing sub-circuit, making comparisons of the first number of bits and the second number of bit value transitions with preset values;

at the comparing sub-circuit, generating a signal indicative of detection of end-of-burst based on a result of the comparisons; and at an intermediate reset element of the circuit, generating a reset signal upon a condition of the second counter exceeding a particular preset value, whereby reaction time of the circuit is accelerated by occurrence of the condition prior to receiving a total number of bits in the portion.

8. The method of claim 7, wherein each bit in the bit stream has a bit duration, and wherein counting the first number of bits in the portion with the first counter comprises counting an integer number of bit durations.

9. The method of claim 7, wherein the preset values are programmable.

10. The method of claim 7, wherein making the comparisons of the first number of bits and the second number of bit value transitions with preset values comprises determining that the first number of bits equals a total number of bits in the portion, and wherein generating the signal indicative of detection of end-of-burst based on the result of the comparisons comprises determining that the second number of bit value transitions is no greater than a preset threshold value.

11. The method of claim 7, wherein receiving the portion of a bit stream comprises receiving a total number of bits equal to a multiple of a maximum number of consecutive identical digits allowed in a bit stream according to the 10 GEPON standard or the XGPON2 standard.

\* \* \* \* \*